United States Patent [19]

Vuillaume et al.

[11] Patent Number: 5,295,997
[45] Date of Patent: Mar. 22, 1994

[54] PROCESS FOR THE PRODUCTION OF A COTTON-BASED, WASHABLE NONWOVEN CLOTH AND CLOTH THUS OBTAINED

[75] Inventors: André Vuillaume, Biviers; Jean-Claude Lacazale, Presle, both of France

[73] Assignee: Perfojet S. A., France

[21] Appl. No.: 911,472

[22] Filed: Jul. 10, 1992

[30] Foreign Application Priority Data

Jul. 25, 1991 [FR] France ................. 91 09697

[51] Int. Cl.$^5$ ............... D06M 15/59; D06M 15/55
[52] U.S. Cl. ............................. 8/194; 8/196; 8/120; 8/127.6; 8/115.61; 8/181; 8/115.7; 427/389.9; 427/386; 427/428; 427/177
[58] Field of Search ............... 8/115.51, 115.56, 116.1, 8/115.57, 181, 194, 127.6, 196, 115.61, 120, 115.7; 28/104; 427/389.9, 392, 386, 381, 428, 177; 428/227, 235, 245

[56] References Cited

U.S. PATENT DOCUMENTS

| | | |
|---|---|---|
| 3,214,819 | 11/1965 | Guerin . |
| 3,305,493 | 2/1967 | Emmons . |
| 3,508,308 | 4/1970 | Bunting et al. . |
| 4,570,311 | 2/1986 | Kawamura et al. ........... 28/104 |
| 4,959,894 | 10/1990 | Jeffers et al. ................ 28/104 |
| 5,071,681 | 12/1991 | Manning et al. ............. 427/393 |

FOREIGN PATENT DOCUMENTS

| | | |
|---|---|---|
| 304825 | 3/1989 | European Pat. Off. . |
| 337451 | 10/1989 | European Pat. Off. . |
| 1569015 | 1/1970 | Fed. Rep. of Germany . |
| 1546369 | 5/1970 | Fed. Rep. of Germany . |

Primary Examiner—Prince Willis, Jr.
Attorney, Agent, or Firm—Parkhurst, Wendel & Rossi

[57] ABSTRACT

A process for the production of a spunlace nonwoven cloth based on cotton fibers, which includes continuously advancing the cloth (1) based on cotton fibers, interlacing (2, 3) those fibers with the aid of a plurality of water jets under pressure, drying (8) the interlaced cloth, and, finally, taking delivery (10) of the spunlace cloth (9) thus obtained. After interlacing (2, 3) and before drying (8) the free water contained in the interlaced cloth (4) is drained (5), then the drained cloth is impregnated (6) using an aqueous solution of a polyamide-amine-epichlorohydrin (PAE) resin in an amount, measured as solids, of 0.2% to 1% of the weight of the cotton fibers, and after having expelled the excess solution, the impregnated cloth (7) is dried (8) at a temperature sufficient to at least trigger the cross-linking of the PAE resin deposited.

24 Claims, 1 Drawing Sheet

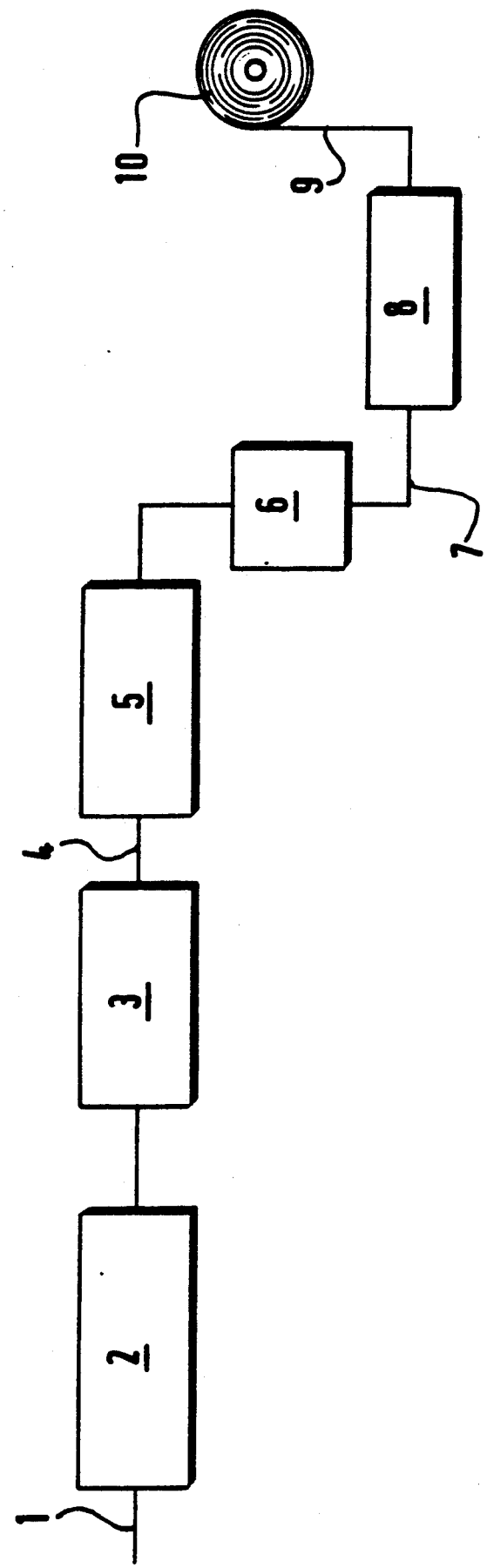

PROCESS FOR THE PRODUCTION OF A COTTON-BASED, WASHABLE NONWOVEN CLOTH AND CLOTH THUS OBTAINED

BACKGROUND OF THE INVENTION

The invention relates to a process for the production of a cotton-based, lightweight and washable, nonwoven cloth. It also relates to the cotton-based, durable or semi-durable, washable cloths thus obtained.

A process for the production of nonwoven cloths has been described in U.S. Pat. No. 3,214,819, U.S. Pat. No. 3,485,706 and U.S. Pat. No. 3,508,308, in which process the cohesion and the interlacing of the elementary fibers with one another is obtained not by mechanical means but by means of a plurality of jets of water under pressure passing through a moving fleece or cloth and, like needles, causing the fibres to intermingle with one another. These nonwoven cloths are known in the literature under the English term "spunlace cloths" or "spunlace". It would therefore not serve any purpose to describe them here in detail. These "spunlace" cloths are essentially defined by the fact that their consolidation results from hydraulic interlacing.

Moreover, it is well known to produce cotton nonwoven cloths by a dry method or even by a wet method, that is to say papermaking method. These cotton nonwoven cloths are essentially desired for their absorbent power. They are therefore disposable, in particular for hygiene, medicine or as a wipe.

The production of "spunlace" cloths in cotton has been proposed. In this way, lightweight materials are obtained which are very soft to the touch and slightly fluffy. Unfortunately, these cloths have a poor resistance to abrasion when wet. In other words, from the time they are wetted, these cotton-based "spunlace" cloths lose their body and their textile handle, which are, however, highly desirable. It is therefore impossible to wash these cloths, which disintegrate very rapidly as soon as they are washed for the first time.

Now, however, the market increasingly calls for cotton-based lightweight cloths capable of being washed several times, while retaining their textile touch and body.

In order to overcome these disadvantage, it has been proposed to introduce binders, in particular latexes, into these cotton "spunlace" cloths. Unfortunately, this process is not satisfactory since the incorporation of such binders considerably changes the touch and the body of the products and also their absorption capacity, as well as the suppleness.

For all of these reasons it is not possible to date to produce washable cotton "spunlace" cloths while retaining the main features of their mechanical and textile properties, which are increasingly desired.

SUMMARY OF THE INVENTION

The present invention mitigates these disadvantages.

It provides an improved process for the production of cotton "spunlace" cloths, which process makes it possible economically and reliably to obtain such washable cotton "spunlace" cloths, which retain their mechanical and textile properties even after several washes (five washes and more).

The process according to the invention for the production of a "spunlace" nonwoven cloth based on cotton fibers, which comprises continuously:

advancing a cloth based on cotton fibers,
interlacing these fibres with the aid of a plurality of water jets under pressure,
drying said interlaced cloth,
and, finally, taking delivery of the "spunlace" cloth thus obtained,
is characterised;
in that, after interlacing and before drying, the free water contained in the interlaced cloth is drained;
then said drained cloth is impregnated using an aqueous solution of a polyamide-amine-epichlorohydrin (PAE) resin in an amount, measured as solids, of 0.2% to 1% of the weight of the cotton fibers;
and, after having expelled the excess solution, the impregnated cloth is dried at a temperature sufficient to at least initiate the crosslinking of the PAE resin deposited.

In other words, the invention include preparing a "spunlace" cloth based on cottom fibers in a known manner, then, after interlacing but before drying, draining said wet cloth and then impregnating with an aqueous solution of a PAE resin in an amount of 0.2 to 1% of the weight of the cotton fibers. After having initiated and completed the crosslinking of the PAE resin, a washable "spunlace" cloth which has excellent mechanical properties, a good handle, good body and good suppleness, even after several repeated washings, is obtained in an unexpected and surprising manner.

BRIEF DESCRIPTION OF THE DRAWING

The appended single FIGURE shows diagrammatically an installation for the implementation of the process according to the invention.

DETAILED DESCRIPTION OF THE INVENTION

Advantageously, in practice: the base cloth consists mainly of cotton. The cotton fibers may be mixed with fibers of a different type, in particular cellulose fibers (viscose, linen, ramie and the like), or even synthetic fibers (such as polyamide, polyester or polypropylene) in particular in order to improve the mechanical properties of the cloth. The length of these fibers may be the same as or different from that of the cotton fibers.

The base cloth based on cotton fibers has a weight of between 30 and 300 g/m$^2$. It has been observed that if this weight is less than 30 g/m$^2$ the cloth, or more accurately the fleece, has few bonds and little coherence and is difficult to handle and to interlace by jets of water. Similarly, if the weight exceeds 300 g/m$^2$, the process lacks economic interest. It has been observed that good results were obtained with base cloths having a weight of between 30 and 100 g/m$^2$.

The interlacing by a jet of water under pressure is carried out in a known manner (pressure between 30 and 250 bars), the jets being directed at one or both sides of the base cloth.

draining of the free water contained in the wet interlaced cloth is carried out by padding or suction; all of the free water, that is to say the water contained between the cotton fibers, with the exclusion of the water included in these cotton fibers (absorbed water), is thus expressed;

impregnation with the PAE solution is carried out by any appropriate technique, such as impregnation, padding, full bath or spraying; the amount of resin deposited, in dry cross-section, is between 0.2 and 1%. It has been observed that if this amount is less than 0.2% no significant improvement is obtained. On the other hand, if this amount exceeds 1% no improvement is observed, while the cost is increased to no effect. The amount deposited is variable depending on the intended applications and the washability criteria and depending on whether it is desired to obtain semi-durable products (capable of being washed three to ten times) or durable products (ten washings and more). It has been observed that good results were obtained with amounts on the order of 0.4 to 0.8%.

After impregnation the concentration of the aqueous PAE solution is adjusted by padding and the impregnated "spunlace" cloth is then dried continuously, said drying being carried out by any known means, such as an oven with a through-flow of air, cylindrical driers, a stenter frame, infrared lamps and the like. It is essential to heat to a temperature sufficient to give rise to cross-linking of the PAE resin or, more accurately to trigger this crosslinking. In practice, drying is carried out at a temperature of at least 140° C.

After collecting the cloth on a reel, crosslinking is allowed to proceed on the worked material, for example by storing for one to two weeks at ambient temperature.

As is known, polyamide-amine-epichlorohydrin (PAE) resins are generally obtained by a polycondensation reaction of a carboxylic diacid and a triamine, followed by reaction of epichlorohydrin with the low molecular weight chains of the polyamide-polyamine. Epichlorohydrin converts the secondary amine groups to tertiary amine or even quaternary ammonium groups and then introduces branching points into the chain. The result is polymers of low molecular weight which are slightly branched, in particular in order to be able to be readily soluble in water, and have a cationic character, even for slightly alkaline pHs, and crosslinking possibilities.

It is thought that the wet strength (WS) obtained results from groups in these resins which are capable of being involved, that is to say:
secondary and tertiary amine groups;
epoxy groups, and
azetidinium groups.

The latter two groups are capable of giving covalent bonds by reaction with other groups in the resin (homo-crosslinking), or with functional groups in the cotton fibers (cocrosslinking). The development of the wet strength is accelerated by heating to 140° C. or above. In fact, it has been observed that the wet strength (WS) of the "spunlace" cloths according to the invention is obtained particularly on drying and that this strength continues to develop during storage. This must result in part from the fact that curing of the resin continues during storage.

The polyamide-amine-epichlorohydrin (PAE) resins are well known. These resins are available commercially, in particular under the following trade names:
NADAVIN LTS or LTN-A from the German company BAYER, and
KYMENE 557 H or 709 from the American company HERCULES.

These resins are currently used for papermaking, by incorporating them in the pulp in the pulper with a view to giving the paper a good wet strength, in particular for the production of teabags. In this technique the resin is therefore introduced into the pulp in the wet and not onto a dry fleece. Unfortunately, the papers obtained have no resistance to washing, which is not troublesome for the envisaged application, which is disposable use.

It is surprising to find that the selection of a "spunlace" cloth from the various known cotton-based cloths, in combination with binding with a very small amount of a particular resin, that is to say PAE resin, makes it possible successfully to resolve a problem which has existed for a long time, that is to say the possibility of producing washable "spunlace" cloths which, even after several repeated washings, retain not only all of their mechanical properties but also all of their textile characteristics of touch, drapability, suppleness, and the like.

The way in which the invention may be implemented and the advantages which result therefrom will be better apparent from the implementation examples which follow, supported by the appended single figure.

In this continuous installation, the following references have the indicated meanings:
(1): a base cloth of cotton fibers
(2): the first binding unit of the hydraulic binding machine, such as that sold by the present assignee under the tradename JETLACE;
(3): the second hydraulic binding unit of the same machine, for interlacing the other side, in order to improve the abrasion resistance; in practice, the amount of energy transferred by the water jets of the binding units (2, 3) to the cloth (1) is adjusted to a value of between 0.2 and 1.1 kWH per kilo of fibers and the diameter of the water jets is adjusted to a value of between 100 and 150 microns, at a pressure of between 30 and 250 bars;
(4): the interlaced wet cloth obtained;
(5): the padding unit for expelling the free water contained in the wet "spunlace" cloth (4) (absorbed residual water of the order of 30%);
(6): unit for impregnation with the aqueous PAE solution;
(7): the "spunlace" cloth impregnated with PAE;
(8): the drying unit, for example heated to 140° C.;
(9): the washable "spunlace" cloth obtained, wound in the form of a reel (10).

The interlacing (2, 3) and impregnating (6) units may be combined with suction tanks intended to remove some of the water, it being possible for these tanks to replace the padding unit (5).

EXAMPLE 1

A "spunlace" cloth (4) weighing 35 g/m$^2$ and based on carded bleached cotton fibers is prepared in a known manner using the installation (2, 3). The pressure of the injectors (2, 3) is adjusted to 90 bars and the diameter of the injection nozzles is adjusted to 0.12 mm. The speed of advance of the cloth (1) is adjusted to 60 m/min. After drying the cloth (4), followed by immediate winding (conventional technique), a "spunlace" cloth is obtained which has an excellent handle and a good touch but which disintegrates entirely from the time of the first wash and may therefore not be reused.

The cloth is therefore a disposable cloth.

EXAMPLE 2

Example 1 is repeated. However, the wet cloth (4) obtained is impregnated, after drying (5), by padding with an aqueous solution of a PAE resin marketed by HERCULES under the trade name "KYMENE 557 H". The amount deposited (measured as solids) is adjusted to 0.8% by means of padding. Drying is carried out in (8) on a cylinder which has a through-flow of air at 150° C. and the impregnated "spunlace" cloth (9)

obtained is then stored for two weeks in order to complete crosslinking/curing of the PAE resin.

After eight customary domestic washes at 70° C. in a washing machine using water to which commercial detergent is added, no significant deterioration either in the mechanical properties (abrasion resistance, tear strength) or in the textile properties (touch, body, suppleness) of the impregnated "spunlace" cloth (9) is observed.

EXAMPLE 3

Example 1 is repeated, reducing the amount deposited to 0.2%.

The impregnated "spunlace" cloth obtained (9) is able to withstand only three domestic washes.

EXAMPLE 4

Example 2 is repeated, replacing the cloth (1) by a papermaking sheet based on cotton fibers and weighing about 80 g/m$^2$.

The PAE resin does not fix on the cotton fibers and does not penetrate into the sheet, so that the latter is not washable and has no textile property in respect of body or touch.

The process according to the invention has numerous advantages compared with those marketed to date. The following may be mentioned:

the absence of change in the characteristics of the cotton-based "spunlace" cloth, which retains all of its textile properties, in particular in respect of touch, suppleness, body and absorption;

good retention of its textile properties and mechanical properties, even after several repeated washes; and good improvement in the wet properties.

Consequently, these cloths may be successfully used in numerous fields of application where a textile touch, mechanical properties and the possibility of being washed several times are desired simultaneously. The following may be mentioned: wiping cloths, table and household linen, the production of clothing, in particular working clothes, linings, and the like.

We claim:

1. A process for producing a spunlace non-woven cotton cloth which can be repetitively laundered without significant deterioration in the mechanical and textile properties thereof, said process comprising the steps of:

providing a continuous supply of non-woven cotton-based cloth;

applying pressurized jets of water to the non-woven cotton-based cloth to interlace the fibers thereof;

draining free water from the cloth of interlaced fibers;

impregnating the cloth of interlaced fibers with an aqueous solution of a polyamide-amine-epichlorohydrin resin in an amount, measured as solids, of 0.2% to 1.0% of the weight of the fibers in the cloth; and drying the impregnated cloth at a temperature sufficient to at least initiate crosslinking of the impregnated resin.

2. The process of claim 1, wherein the resin is present in an amount of 0.4% to 1.0% of the weight of the fibers in the cloth.

3. The process of claim 1, wherein the cloth has a weight of between 30 and 300 g/m$^2$.

4. The process of claim 2, wherein the cloth has a weight of between 30 and 300 g/m$^2$.

5. The process of claim 1, wherein the free water is drained from the cloth of interlaced fibers by padding.

6. The process of claim 2, wherein the free water is drained from the cloth of interlaced fibers by padding.

7. The process of claim 3, wherein the free water is drained from the cloth of interlaced fibers by padding.

8. The process of claim 4, wherein the free water is drained from the cloth of interlaced fibers by padding.

9. The process of claim 7, wherein impregnation is carried out by padding and from 0.4 to 0.8% of resin is impregnated in the cloth.

10. The process of claim 2, wherein impregnation is carried out by padding and from 0.4 to 0.8% of resin is impregnated in the cloth.

11. The process of claim 3, wherein impregnation is carried out by padding and from 0.4 to 0.8% of resin is impregnated in the cloth.

12. The process of claim 4, wherein impregnation is carried out by padding and from 0.4 to 0.8% of resin is impregnated in the cloth.

13. The process of claim 5, wherein impregnation is carried out by padding and from 0.4 to 0.8% of resin is impregnated in the cloth.

14. The process of claim 6, wherein impregnation is carried out by padding and from 0.4 to 0.8% of resin is impregnated in the cloth.

15. The process of claim 7, wherein impregnation is carried out by padding and from 0.4 to 0.8% of resin is impregnated in the cloth.

16. The process of claim 8, wherein impregnation is carried out by padding and from 0.4 to 0.8% of resin is impregnated in the cloth.

17. The process of claim 5, wherein the impregnated cloth is dried at a temperature of at least 140° C.

18. The process of claim 6, wherein the impregnated cloth is dried at a temperature of at least 140° C.

19. The process of claim 7, wherein the impregnated cloth is dried at a temperature of at least 140° C.

20. The process of claim 8, wherein the impregnated cloth is dried at a temperature of at least 140° C.

21. The process of claim 17, wherein after drying, the cloth is gathered on a reel and crosslinking of the resin impregnated in the cloth is allowed to continue at ambient temperature on the reel for one to three weeks.

22. The process of claim 18, wherein after drying, the cloth is gathered on a reel and crosslinking of the resin impregnated in the cloth is allowed to continue at ambient temperature on the reel for one to three weeks.

23. The process of claim 19, wherein after drying, the cloth is gathered on a reel and crosslinking of the resin impregnated in the cloth is allowed to continue at ambient temperature on the reel for one to three weeks.

24. The process of claim 20, wherein after drying, the cloth is gathered on a reel and crosslinking of the resin impregnated in the cloth is allowed to continue at ambient temperature on the reel for one to three weeks.

* * * * *